United States Patent [19]

Zapfe et al.

[11] Patent Number: 6,001,451
[45] Date of Patent: Dec. 14, 1999

[54] SANDWICH STRUCTURE

[75] Inventors: Jeffrey A. Zapfe, Cambridge; Hamid Shaidani, Randolph; Steven F. Shedd, Plympton, all of Mass.

[73] Assignee: Kinetic Systems, Inc., Roslindale, Mass.

[21] Appl. No.: 08/890,821

[22] Filed: Jul. 10, 1997

[51] Int. Cl.⁶ .................................................. B32B 3/14
[52] U.S. Cl. ............................ 428/78; 428/47; 428/76; 428/189; 52/782.2
[58] Field of Search .................................. 428/47, 77, 78, 428/75, 76, 189, 209, 457; 52/782.2

[56] References Cited

U.S. PATENT DOCUMENTS

| | | |
|---|---|---|
| 3,530,033 | 9/1970 | Hildebrandt .............................. 428/47 |
| 3,578,539 | 5/1971 | Lash ........................................ 428/78 |
| 4,523,772 | 6/1985 | Arnsteiner ............................... 428/47 |
| 4,906,501 | 3/1990 | Honma et al. ........................... 428/78 |
| 5,162,142 | 11/1992 | Ericson et al. ......................... 428/78 |

*Primary Examiner*—Donald Loney
*Attorney, Agent, or Firm*—Iandiorio & Teska

[57] ABSTRACT

An improved sandwich structure including a top facing sheet, a bottom facing sheet, a core located between the top facing sheet and the bottom facing sheet, and a damping layer extending only partially across the core and not fully interrupting the continuity of the core between the top facing sheet portion and the bottom facing sheet portion to provide damping to the core without adversely affecting the static stiffness or strength of the core.

4 Claims, 6 Drawing Sheets

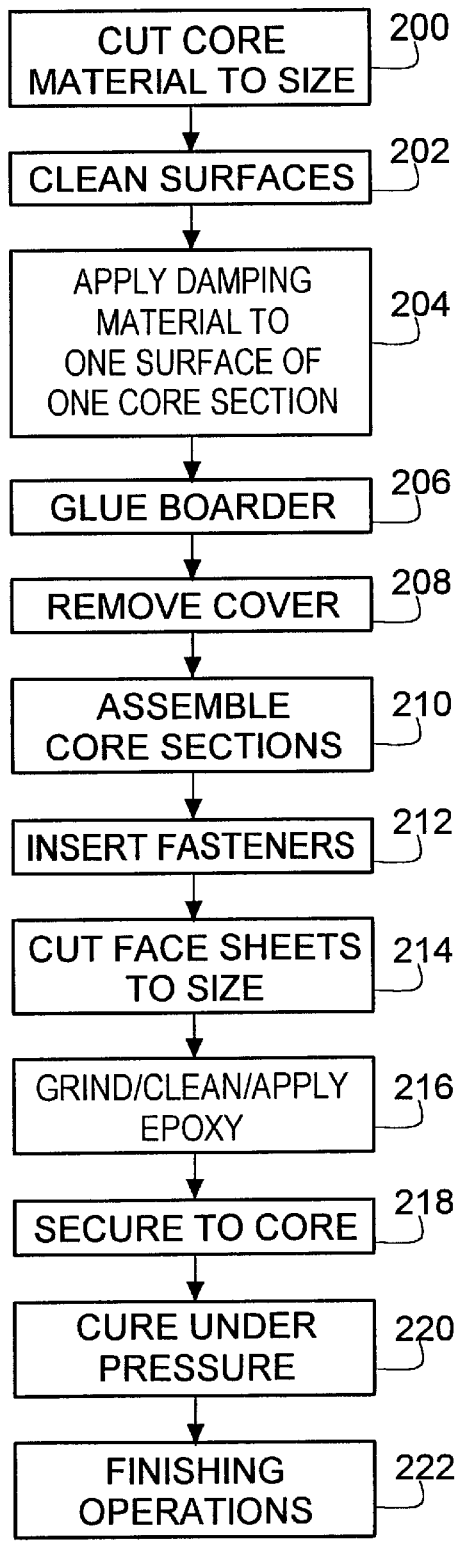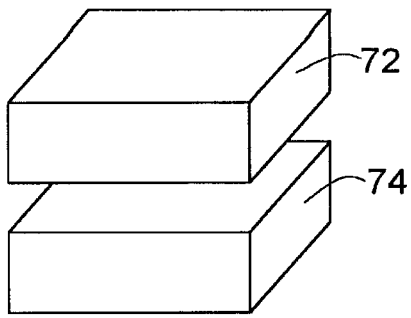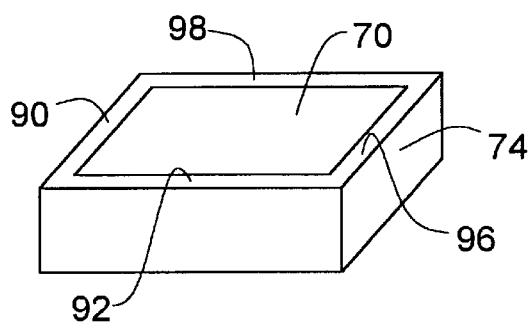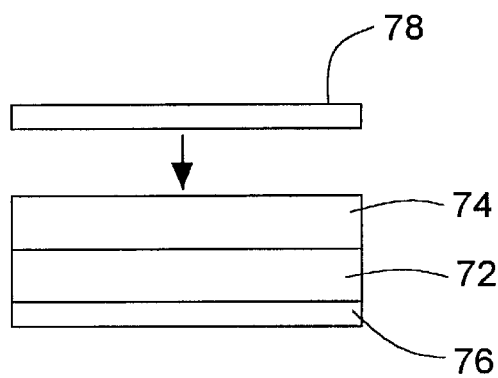
FIG. 5B
FIG. 5C
FIG. 5D
FIG. 5A

SANDWICH STRUCTURE

FIELD OF INVENTION

This invention relates to a sandwich structure such as a work station table top.

BACKGROUND OF INVENTION

Sandwich structures such as work station table tops generally include top and bottom facing sheets separated by a core made out of e.g., wood, particle board, or honeycomb material. Such table tops are used to provide a firm stable surface on which optical and other devices can be mounted or placed for scientific study or analysis.

To eliminate the effects of undesirable vibration, such sandwich structures are typically treated with a damping material. There are two prior art damping treatment methods: surface damping treatment and internal damping treatment.

In surface damping treatment methods, a damping layer is applied to one exterior surface, usually the bottom facing sheet, of the sandwich structure. Surface damping treatments are attractive because the damping layer applied to the surface does not reduce the stiffness or strength of the core. However, a much more effective location for the damping layer from a damping standpoint is inside the core, near its neutral plane. Such an internally damped structure exhibits a resonant compliance (a measure of damping performance) many times lower than comparable surface treatments.

Unfortunately, however, internal damping treatments also place the relatively compliant damping layer in the primary structural load path of the core severely reducing the stiffness and strength of the core. Such a structure will deflect undesirably under a static load and will also creep as the damping material stretches over time. For many applications, static strength and creep are critical design parameters and the internal damping treatment method cannot be used as a viable vibration control strategy.

Thus, surface damping treatments must be used which, as discussed above, do not always maximize vibration attenuation.

SUMMARY OF INVENTION

It is therefore an object of this invention to provide an improved vibration damped sandwich structure such as a work station table top.

It is a further object of this invention to provide such a structure which exhibits a resonant compliance many times lower than comparable surface damping treatment methods.

It is a further object of this invention to provide such a structure which does not suffer from the severe reduction in stiffness and strength which occurs in prior art internal damping treatment methods.

It is a further object of this invention to provide such a structure which does not suffer from deflection under static loads and creep thereby providing a significant improvement over prior internal damping treatment methods.

It is a further object of this invention to provide such a structure which retains the improved damping performance of internally damped sandwich structures without the deflection, creep, and reduced static strength properties of internally damped sandwich structures.

This invention results from the realization that suitable tradeoff between the damping, strength, and creep characteristics of a sandwich structure such as a work station table top can be effected by placing a damping layer in the core so that the edges of the damping layer are not coterminous with the edges of the core thus leaving an uninterrupted border area in the core which does not affect the continuity of the core between the top and bottom facing sheets thereby providing adequate damping without adversely effecting that static stiffness or strength of the core.

This invention features an improved sandwich structure such as a work station table top comprising a top facing sheet portion, a bottom facing sheet portion, a core located between the top facing sheet portion and the bottom facing sheet portion, and a damping layer extending only partially across the core and not fully interrupting the continuity of the core between the top facing sheet portion and the bottom facing sheet portion to provide damping to the core without adversely affecting the static stiffness or strength of the core.

The top facing sheet portion and the bottom facing sheet portion may be separate metal sheets or surfaces of a metal core. The core preferably includes two polygon shaped solid sections and the damping layer has at least one edge which is not coterminous with an edge of the polygon shaped solid core sections. In the preferred embodiment, the core includes two rectangular shaped solid sections and the damping layer has all its edges not coterminous with the edges of the two rectangular shaped solid sections.

In another embodiment, the core includes two sections, one section having the top facing sheet portion on one surface thereof, the other section having the bottom facing sheet portion on one surface thereof. The damping layer may be located at the neutral plane of the core. The core may be wood, plastic or metal.

This invention also features a work station table top structure comprising a rectangular solid top facing sheet, a rectangular solid bottom facing sheet, a rectangular solid core in two sections located between the top and bottom facing sheets, and a damping layer disposed between the two core sections and having edges which are not coterminous with the edges of the core to provide damping to the core without adversely effecting the static stiffness or strength of the core. Preferably, all the edges of the damping layer are not coterminous with the edges of the core.

DISCLOSURE OF PREFERRED EMBODIMENT

Other objects, features and advantages will occur to those skilled in the art from the following description of a preferred embodiment and the accompanying drawings, in which:

FIGS. 5A–5D are flow charts depicting the method of fabricating the sandwich structure of this invention shown in FIG. 3.

Figure 1:
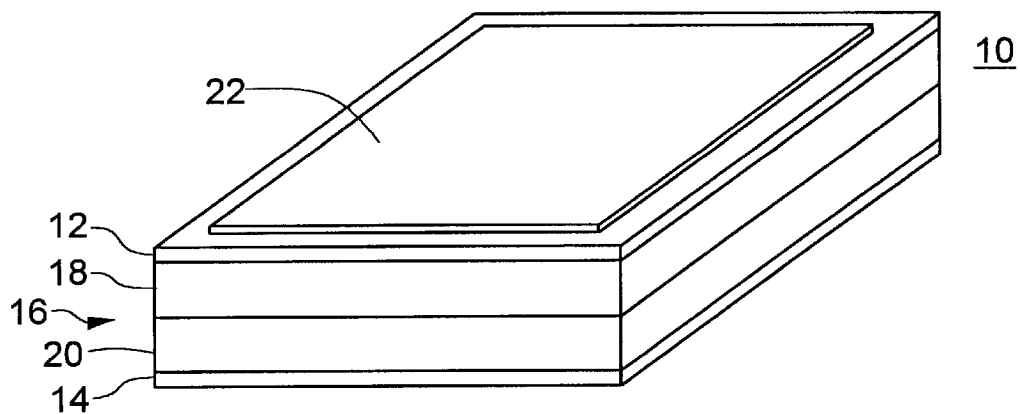
FIG. 1 is a schematic view of a prior art sandwich structure with a surface damping treatment applied to the top facing sheet.

Prior art surface damped sandwich structure 10, FIG. 1, includes top 12 and bottom 14 facing sheets and core 16 in two sections 18 and 20 therebetween. Damping layer 22 is secured to top facing sheet 12 as shown.

As discussed in the Background of Invention above, although the surface damping does not reduce the stiffness or strength of the core, the damping characteristics of prior art surface damped structure 10 are not optimized.

Figure 2:
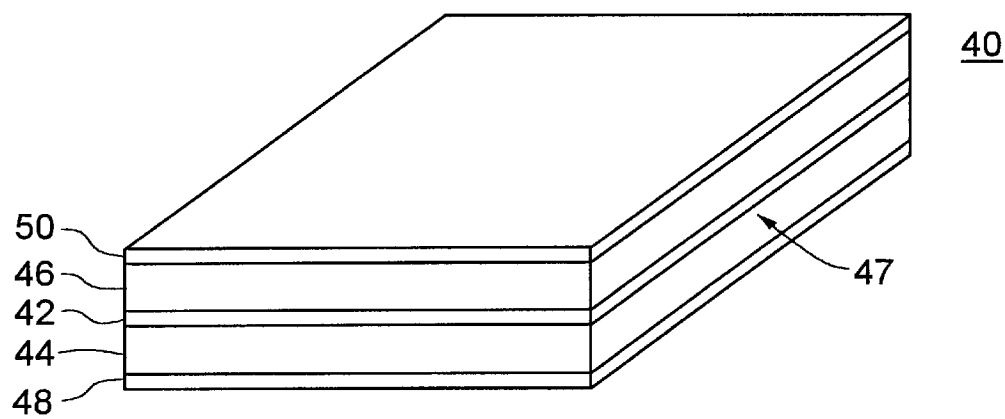
FIG. 2 is a schematic view of a prior art sandwich structure with an internal damping layer.

Thus, it was realized that a more effective location for damping layer is internal to the core as shown for prior art internally damped sandwich structure 40, FIG. 2, having damping layer 42 applied between core sections 44 and 46 of core 47 between bottom 48 and top 50 facing sheets.

As discussed in the Background of Invention, above, such an internally damped structure exhibits a resonant compliance, a measure of damping performance, many times lower than comparable surface treatments as shown for structure 10, FIG. 1, but the internal damping treatment method also places the relatively compliant damping layer 42, FIG. 2, in the primary structural load path adversely reducing the stiffness and strength of structure 40. Structure 40 will deflect undesirably under a static load and may also creep as damping layer 42 stretches with time. For many applications, where static strength and creep are critical design parameters, internally damped sandwich structure 40 is not a viable consideration for vibration control.

It was discovered by the inventors of the subject application, however, that these problems associated with internally damped structure 40 are due in part to the fact that the edges of prior art damping layer 42 are coterminous with the edges of core section 44 and 46 thus fully interrupting the continuity of core 47 between the top 50 and bottom 48 facing sheets and that it is this feature which adversely affects the static stiffness and strength of core 47.

Figure 3:
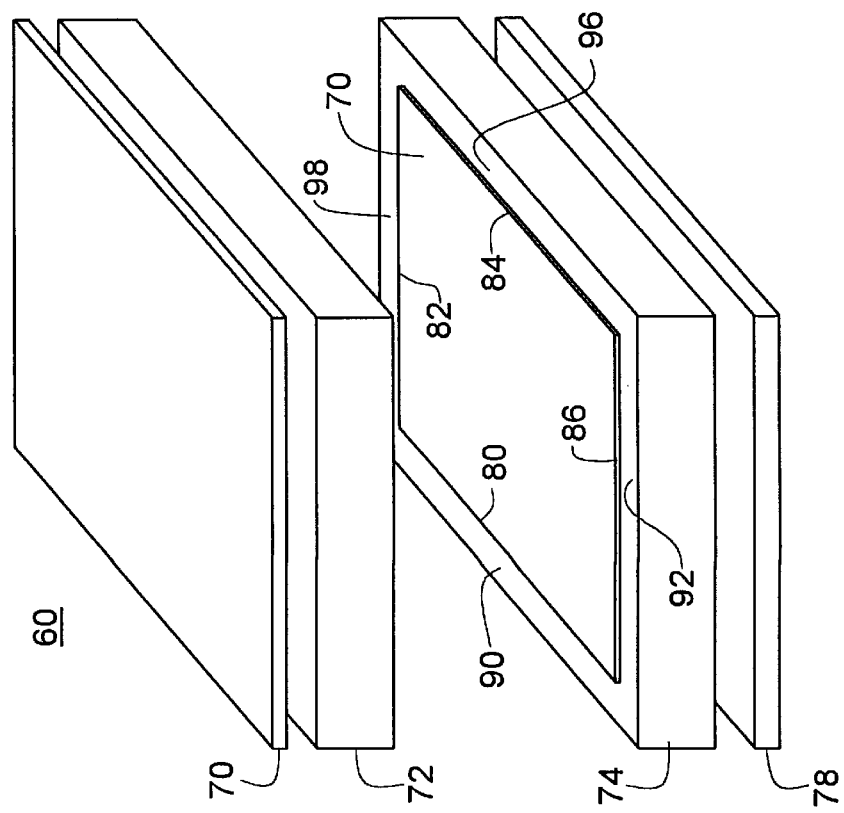
FIG. 3 is an exploded schematic view of the sandwich structure of this invention.

Thus, in this invention, as embodied in work station table top structure 60, FIG. 3, internal damping layer 70 is applied between core sections 72 and 74 separating top 76 and bottom 78 facing sheets so that the edges 80, 82, 84, and 86 of damping layer 70 are not coterminous with the edges of the core thus providing uninterrupted continuity of the core in boarder areas 90, 92, 96, and 98.

This partial core continuity feature provides adequate damping of the core without adversely affecting the static stiffness or strength of the core. And, the effect of this feature is contrary to conventional wisdom which held that if the core sections 72 and 74 were rigidly attached in areas 90, 92, 96, and 98, the damping characteristics of damping layer 70 would be short circuited. Testing and design analysis, however, discussed in more detail with reference to FIGS. 6–8, revealed that structure 60 can be engineered so that the percentage of coverage of damping layer 70 over the surface of core section 74 is tailored to optimized the damping and stiffness characteristics and that uninterrupted core boarder areas 90, 92, 96 and 98 do not short circuit the damping characteristics of damping layer 70.

Thus, sandwich structure 60 of this invention embodies a suitable tradeoff between the damping and strength characteristics by adding a damping layer to the core which is not coterminous with the edges of the core thus leaving a border area in the core which does not interrupt the continuity of the core between the top and bottom facing sheets thereby providing adequate damping without adversely effecting the static stiffness or strength of the core.

In the preferred embodiment, each component of structure 60 is a solid rectangular polygon. Facing sheets 76 and 78 are made of stainless or carbon steel or aluminum, and core sections 72 and 74 are particle board although honeycomb sections could be used in the core. Damping layer 70 is a viscoelastic polymer sheet made of strips of 6 inch wide 0.007 inch thick damping tape, part number S301 available from Coating Sciences Inc., 111 Great Pond Drive, Windsor Conn. 06095. A decorative formica layer may be added to top facing sheet 76 to improve the appearance of the work station table top. Core sections 72 and 74 are typically ¾ of an inch thick and table 60 is typically 2 inches thick overall, 30 inches wide and 48 inches long. Such a table top has a load rating of about 700 lbs.

Figure 4:
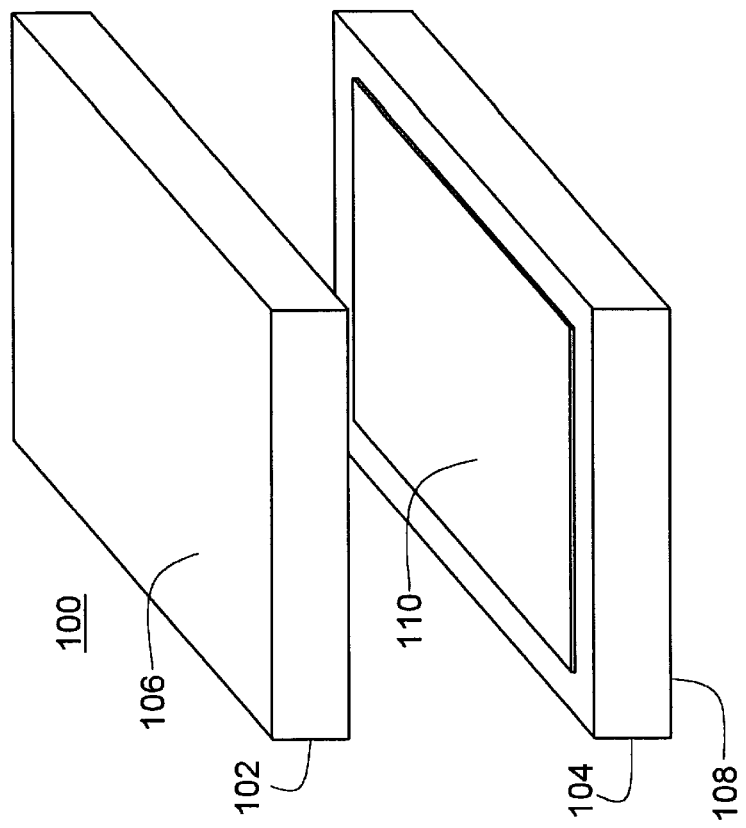
FIG. 4 is a schematic exploded view of another embodiment of the sandwich structure of this invention.

In another embodiment, the top and bottom facing sheets are not separate components with respect to the core. For example, structure 100, FIG. 4, includes metal core sections 102 and 104 having top 106 and bottom 108 facing sheets portions with damping layer 110 located between metal core sections 102 and 104. Note that although in the embodiments shown in FIGS. 3–4, the damping layer is located at the neutral plane of the structure, this is not a limitation of the subject invention. Depending on the specific design criteria and damping, stiffness, and strength characteristics desired, damping layer 70, FIG. 3 or 110, FIG. 4, may be placed at any location in the core and the thickness of the core sections modified accordingly.

To fabricate structure 60, FIG. 3, particle board core sections 72 and 74, FIG. 5B, are cut to size, step 200, FIG. 5A. The surfaces to be joined are then cleaned, step 202, and damping material 70, FIG. 5C, is applied to core section 74, step 204, FIG. 5A leaving a 4 inch boarder on each side. Glue is then applied to border areas 90, 92, 96, and 98, FIG. 5C, step 206, FIG. 5A and the protective cover of material tape 70 is removed, step 208. The two core sections are then assembled, step 210, and fasteners such as screws are driven through the corners of the core sections and nails are driven on four inch centers in a grid pattern through the two core sections, step 212. This assembly is allowed to dry for one day. The metal face sheets are then cut to size, step 214, and then ground and cleaned, and an epoxy is applied to the internal surfaces of the face sheets, step 216. The grinding operation roughens the surfaces and then epoxy is applied first to top facing sheet 76, FIG. 5D, which is placed on a flat surface. The core is then secured to top facing sheet 76, FIG. 5D, and then the bottom facing sheet is glued to the core as shown, step 218, FIG. 5A. This lay-up is then cured under pressure, step 220, using airbags and a pressure of about 6 psi for 24 hours. Various finishing operations, step 222, such as applying a decorative film or formica laminate on the top facing sheet and trim to the sides are then completed.

The dynamic characteristics of three tables were evaluated using a compliance measurement. The compliance is the ratio of the dynamic displacement of the table to the applied dynamic force. The compliance was measured using an instrumented force hammer, an accelerometer, and a fast Fourier analyzer. The tests were conducted using standard impact testing techniques. The tables were suspended by low frequency air mounts, which effectively created a free boundary condition. The compliance was measured at the corner of the table, at a point 5" in from each edge.

Figure 6:
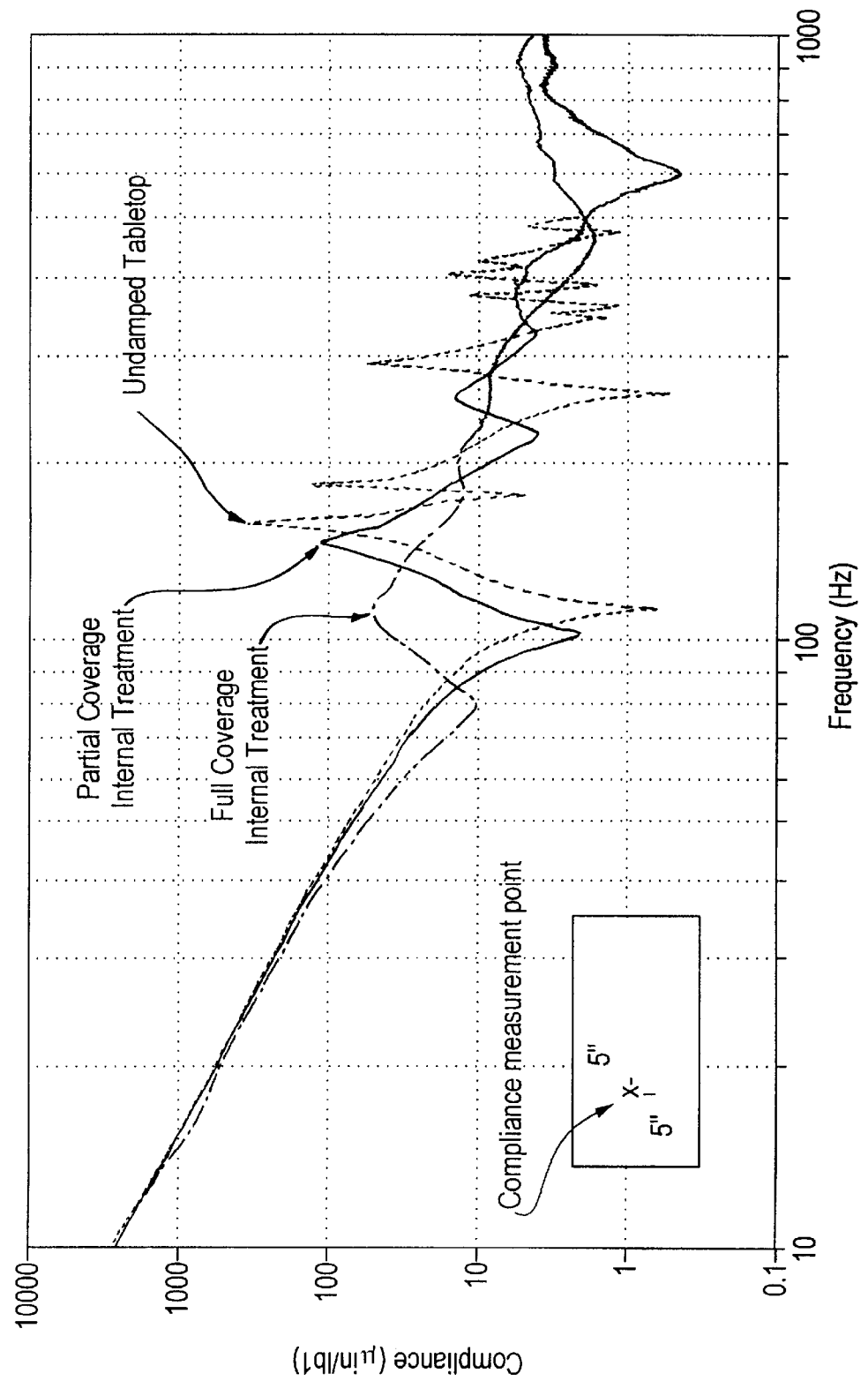
FIGS. 6–8 are charts showing the performance characteristics of the sandwich structure of this invention compared to prior art sandwich structures.

FIG. 6 shows the measured corner compliance for three tabletops, a standard undamped table, a table treated with the partial internal treatment in accordance with this invention; and a table treated with the full coverage internal treatment as shown in FIG. 2. At low frequency, all three compliance curves asymptote to a straight line that represents the compliance of an ideal rigid body. At higher frequencies, the table dynamics affect the compliance as evidenced by the resonant peaks on the plots. For the undamped table, the first resonant peak at 157.5 Hz corresponds to the first bending mode of vibration. Higher frequency peaks correspond to higher order modes of vibration. The magnitude of the compliance at the first resonance, which is inversely related to the amount of damping in the table, was 404 μin/lbf. The first resonance of the partial coverage treatment occurred at 146.9 Hz with a peak compliance of 121.9 μin/lbf. Because the table masses were approximately the same, the frequency difference between the damped and undamped tables can be attributed to a difference in dynamic stiffness. Since dynamic stiffness scales as the square of frequency, the dynamic stiffness of the partial coverage table was approximately 13% lower than the undamped table. Table damping, however, which scales as the inverse of the peak compliance, was approximately 3.3 times higher for the partial coverage table than it was for the undamped table. In other words, a 13% reduction in dynamic stiffness translated into an increase in damping of 330%. The partial coverage treatment was even more effective in damping higher order modes, in fact, there were no discernible resonant peaks above the 2nd mode.

The table with the full coverage internal damping treatment had a first resonance at 111.9 Hz with a peak compliance of 55.8 μin/lbf. Again, using the relationships between stiffness and frequency, this corresponded to a dynamic stiffness reduction of 50% from the undamped table. The damping increase, however, was very significant, approximately 720% over the undamped table. The very good damping performance, however, came at the expense of a significant reduction in the stiffness of the table.

The static deflection under load is related to the static stiffness of the tabletop. To measure the static deflection under load, the tabletops were installed on a granite surface table and supported at the four corners. Static weights were then applied to the center of the table while the deflection at the center was measured with respect to the granite surface.

Figure 7:
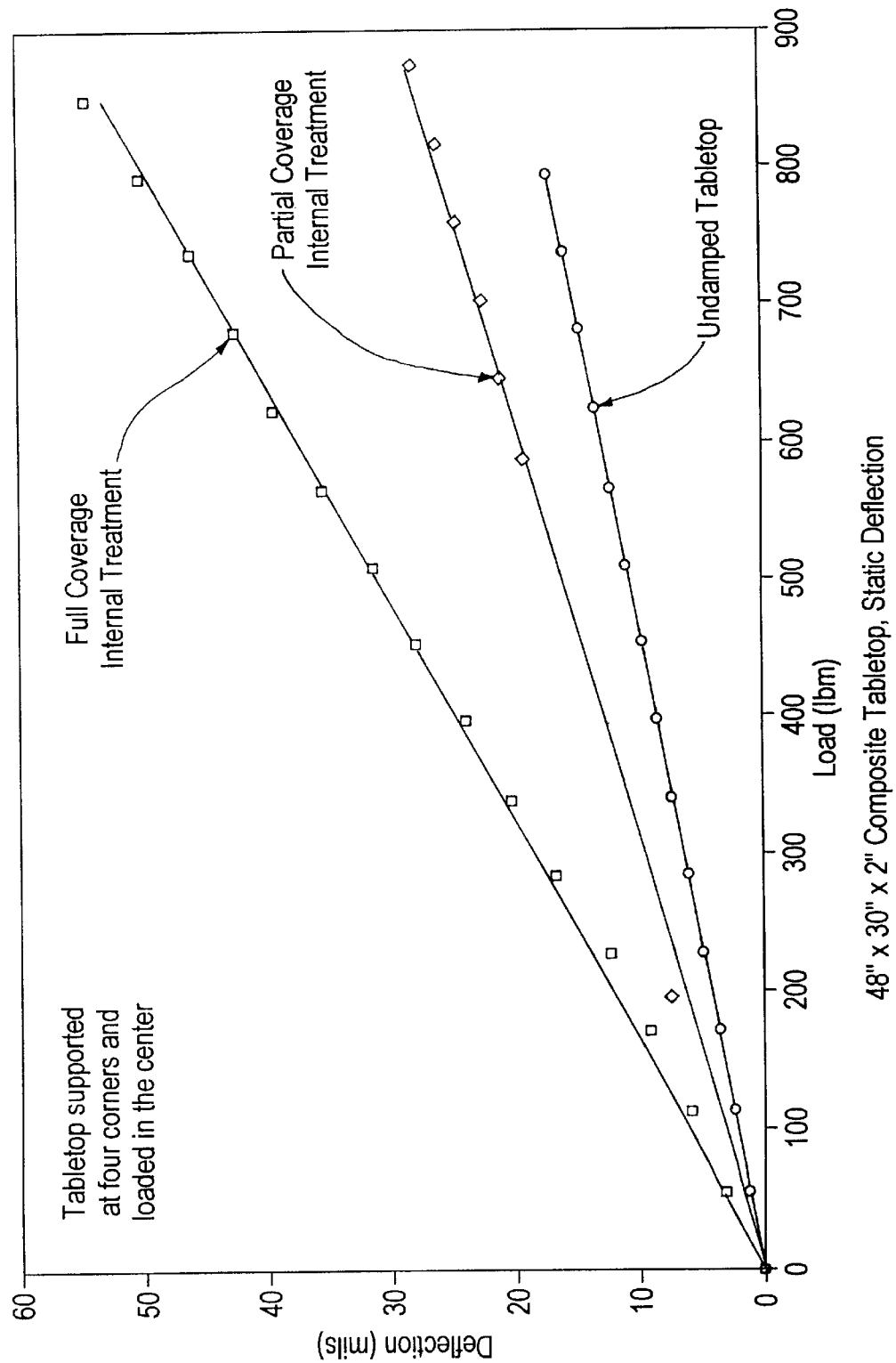

FIG. 7 shows the load-deflection curves for the three tabletops. The discrete points indicate the test points, while the solid lines represent linear fits to the data. The slope of the load-deflection curve is indicative of the static compliance of the structure, where compliance is the inverse of the static stiffness. Using the undamped tabletop as a reference, the partial coverage treatment reduced the table's static stiffness by approximately 32.7%. The full coverage treatment produced a much more severe stiffness reduction, almost 74.5% from the undamped tabletop.

Creep is the continued deformation of a loaded structure over time. Creep is particularly undesirable in applications involving lasers and optics, where the long term alignment of components is critical.

The creep tests on the composite tabletops were conducted subsequent to the static stiffness tests. The maximum static load attained during the stiffness tests was maintained on the tabletop and the center deflection was monitored over a period of time.

Figure 8:
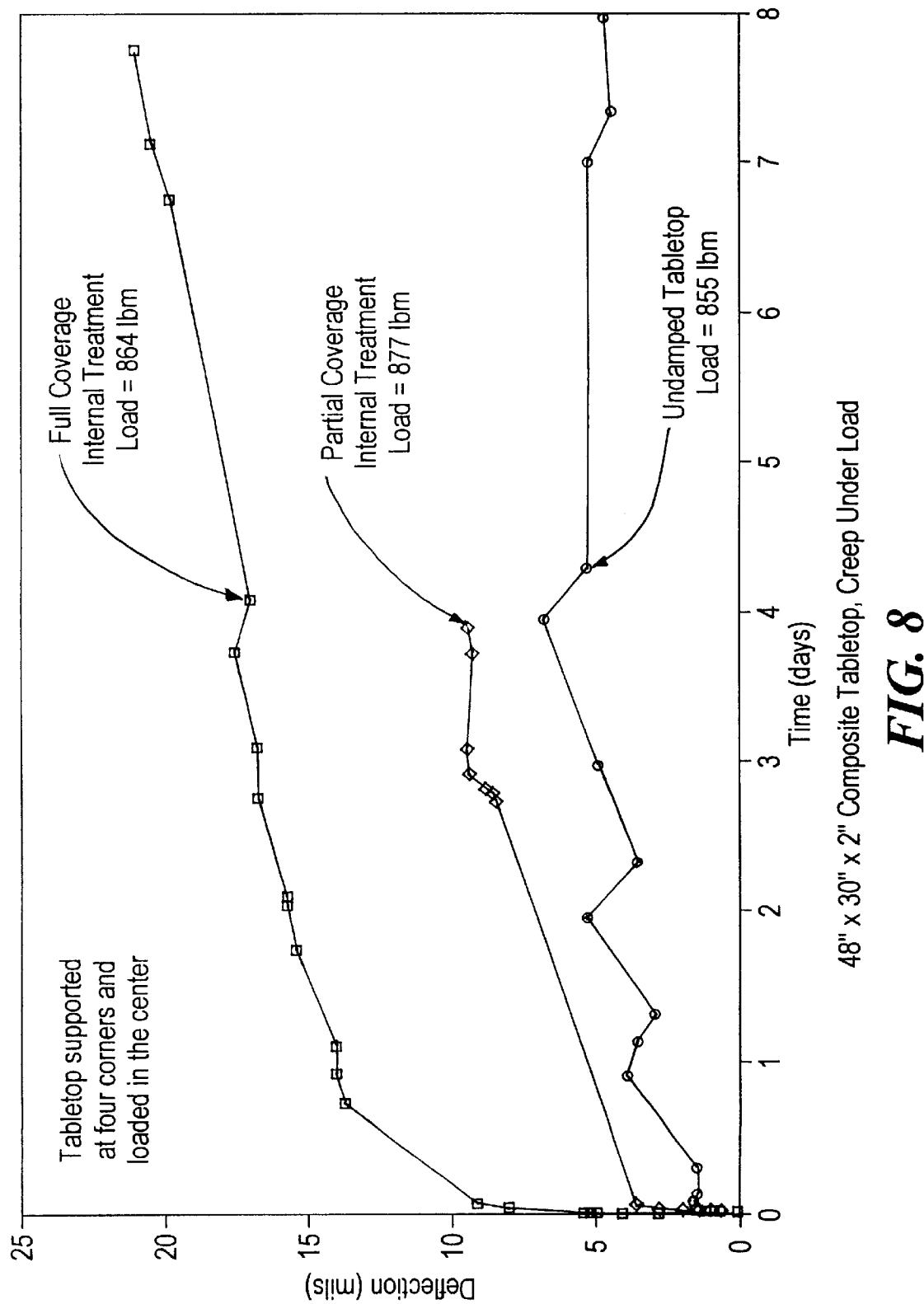

The results from the creep tests appear in FIG. 8. The undamped tabletop was tested over a period of 8 days at a load of 855 lbm. The undamped tabletop did show some creep, gaining approximately 0.005" more deflection over the 8 days. The creep appeared to cease after 4 days, after which time the table's deflection remained constant. The tabletop with the full coverage internal damping treatment was tested at a load of 864 lbm. At 7 days, the creep in the table was almost 20 mils, approximately 4 times higher than the undamped tabletop. Unlike the undamped tabletop, however, the creep showed no sign of abating. The partial coverage damping treatment was tested for 4 days at a load of 877 lbm. The creep essentially ceased after 3 days where it achieved a value of 10 mils, approximately twice the undamped value. While the total creep deflection was higher with the partial coverage damping treatment, the fact that the creep ceased was acceptable.

The experimental tests of the partial coverage damping treatment on composite tabletops in accordance with this invention verified that good damping performance could be realized in a sandwich type construction without significant degradation in the static load bearing capabilities of the structure.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An improved sandwich structure comprising:
   a top facing sheet portion;
   a bottom facing sheet portion;
   a core located between the top facing sheet portion and the bottom facing sheet portion, the core including two rectangular shaped solid sections; and
   a damping layer in the core extending only partially across the core, said damping layer having all its edges not coterminous with the edges of the two rectangular shaped solid sections and not fully interrupting the continuity of the core between the top facing sheet portion and the bottom facing sheet portion to provide damping to the core without adversely affecting the static stiffness or strength of the core.

2. An improved sandwich structure comprising:
   a top facing sheet portion;
   a bottom facing sheet portion;
   a metal core located between the top facing sheet portion and the bottom facing sheet portion; and
   a damping layer in the core extending only partially across the core and not fully interrupting the continuity of the core between the top facing sheet portion and the bottom facing sheet portion to provide damping to the core without adversely affecting the static stiffness or strength of the core.

3. A work station table top structure comprising:
   a rectangular solid top facing sheet;
   a rectangular solid bottom facing sheet;
   a rectangular solid core in two sections located between the top and bottom facing sheets; and
   a damping layer disposed between the two core sections and having edges which are not coterminous with the edges of the core to provide damping to the core without adversely effecting the static stiffness or strength of the core.

4. The structure of claim 3 in which all the edges of the damping layer are not coterminous with the edges of the core.

* * * * *